United States Patent
Ye et al.

(10) Patent No.: US 10,997,857 B2
(45) Date of Patent: May 4, 2021

(54) METHODS AND SYSTEMS FOR CARPOOLING

(71) Applicant: BEIJING DIDI INFINITY TECHNOLOGY AND DEVELOPMENT CO., LTD., Beijing (CN)

(72) Inventors: Yong Ye, Beijing (CN); Kuan Shi, Beijing (CN); Yaxu Li, Beijing (CN); Wei Cheng, Beijing (CN); Binbin Lin, Beijing (CN); Yangbiao Liu, Beijing (CN); Qi Xiao, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 15/721,839

(22) Filed: Sep. 30, 2017

(65) Prior Publication Data

US 2018/0040244 A1 Feb. 8, 2018

Related U.S. Application Data

(63) Continuation of application No. PCT/CN2016/107351, filed on Nov. 25, 2016.

(30) Foreign Application Priority Data

Feb. 24, 2016 (CN) .......................... 201610100973.1
Mar. 14, 2016 (CN) .......................... 201610143434.6
(Continued)

(51) Int. Cl.
*G06Q 10/02* (2012.01)
*G08G 1/123* (2006.01)
(Continued)

(52) U.S. Cl.
CPC ......... *G08G 1/123* (2013.01); *G01C 21/3438* (2013.01); *G06Q 10/00* (2013.01);
(Continued)

(58) Field of Classification Search
CPC ............... G01C 21/3438; G06Q 10/02; G06Q 10/0631; G06Q 10/107; G06Q 10/047;
(Continued)

(56) References Cited

U.S. PATENT DOCUMENTS 8,768,614 B2    7/2014 Lerenc
2004/0215480 A1  10/2004 Kadaba
(Continued)

FOREIGN PATENT DOCUMENTS

CN    1795461 A    6/2006
CN    101004858 A    7/2007
(Continued)

OTHER PUBLICATIONS

Yousaf et al., "A Driver and Riders Matching Approach", 2014 11th Web Information System and Application Conference, pp. 53-60 (Year: 2014).*
(Continued)

*Primary Examiner* — George Chen
*Assistant Examiner* — Freda A Nelson
(74) *Attorney, Agent, or Firm* — Metis IP PLLC

(57) ABSTRACT

The present disclosure relates to systems and methods for carpooling. The systems may perform the methods to obtain a first transaction request associated with a first transportation service of a first service receiver at a first time point; obtain a second transaction request associated with a second transportation service of a second service receiver at a second time point; obtain service provider information of a service provider; determine an assignment strategy associated with combining the first transportation service and the
(Continued)

second transportation service into a third transportation service according to at least one of the first transaction request, the second transaction request, or the service provider information; and send the assignment strategy to at least one of the first service receiver, the second service receiver or the service provider.

20 Claims, 13 Drawing Sheets

(30) Foreign Application Priority Data

Mar. 18, 2016 (CN) .......................... 201610157715.7
Mar. 23, 2016 (CN) .......................... 201610171397.X

(51) Int. Cl.
  *H04W 4/029* (2018.01)
  *G06Q 50/30* (2012.01)
  *G08G 1/00* (2006.01)
  *G01C 21/34* (2006.01)
  *G06Q 10/00* (2012.01)
  *G06Q 10/04* (2012.01)

(52) U.S. Cl.
  CPC ............ *G06Q 10/02* (2013.01); *G06Q 10/047* (2013.01); *G06Q 50/30* (2013.01); *G08G 1/20* (2013.01); *G08G 1/202* (2013.01); *H04W 4/029* (2018.02)

(58) Field of Classification Search
  CPC ........ G06Q 50/30; B60K 35/00; G08G 1/123; G08G 1/202
  USPC .................. 705/5, 7.12, 6; 701/36, 537, 410
  See application file for complete search history.

(56) References Cited

U.S. PATENT DOCUMENTS

| | | | |
|---|---|---|---|
| 2010/0153279 A1* | 6/2010 | Zahn ................ | G06Q 10/08355 705/80 |
| 2010/0280884 A1 | 11/2010 | Levine et al. | |
| 2011/0099040 A1* | 4/2011 | Felt ....................... | H04W 4/025 705/7.12 |
| 2013/0096827 A1 | 4/2013 | McCall et al. | |
| 2013/0158861 A1 | 6/2013 | Lerenc | |
| 2014/0082069 A1 | 3/2014 | Varoglu et al. | |
| 2015/0254581 A1* | 9/2015 | Brahme ................. | G06F 16/29 705/5 |
| 2016/0034845 A1 | 2/2016 | Hiyama et al. | |
| 2016/0129787 A1* | 5/2016 | Netzer ............. | G08G 1/096741 701/36 |
| 2016/0138928 A1* | 5/2016 | Guo ........................ | G06F 16/29 701/537 |

FOREIGN PATENT DOCUMENTS

| | | |
|---|---|---|
| CN | 102385575 A | 3/2012 |
| CN | 102750820 A | 10/2012 |
| CN | 103218769 A | 7/2013 |
| CN | 102496265 B | 12/2013 |
| CN | 103426139 A | 12/2013 |
| CN | 103489309 A | 1/2014 |
| CN | 103514738 A | 1/2014 |
| CN | 103761873 A | 4/2014 |
| CN | 103810843 A | 5/2014 |
| CN | 103971507 A | 8/2014 |
| CN | 103971515 A | 8/2014 |
| CN | 104217585 A | 12/2014 |
| CN | 104332046 A | 2/2015 |
| CN | 104574947 A | 4/2015 |
| CN | 104637291 A | 5/2015 |
| CN | 104715296 A | 6/2015 |
| CN | 104732280 A | 6/2015 |
| CN | 104794890 A | 7/2015 |
| CN | 103514738 B | 9/2015 |
| CN | 104916121 A | 9/2015 |
| CN | 105096166 A | 11/2015 |
| CN | 103971515 B | 12/2015 |
| CN | 105118013 A | 12/2015 |
| CN | 104077912 B | 5/2016 |
| CN | 105976605 A * | 9/2016 |
| JP | 2005060108 A | 3/2005 |
| JP | 2012243228 A | 12/2012 |
| JP | 2013182597 A | 9/2013 |
| JP | 2014219749 A | 11/2014 |
| JP | 2016016835 A | 2/2016 |
| KR | 20050030028 A | 3/2005 |
| KR | 20150090969 A | 8/2015 |
| WO | 2014203256 A1 | 12/2014 |

OTHER PUBLICATIONS

First Office Action in Chinese Application No. 201610100973.1 dated Mar. 20, 2019, 17 pages.
Notice of Rejection in Japanese application No. 2017-552974 dated Feb. 5, 2019, 5 pages.
Examination report No. 2 for Australian Patent Application No. 2016394453 dated Feb. 22, 2019, 10 pages.
First Office Action in Chinese Application No. 201610171397.X dated Feb. 6, 2020, 11 pages.
The Examination Report in Indian Application No. 201717035356 dated Dec. 20, 2019, 6 pages.
First Office Action in Chinese Application No. 201610157715.7 dated Mar. 11, 2020, 14 pages.
First Office Action in Chinese Application No. 201680082666.3 dated Sep. 23, 2020, 26 pages.
Jin Zhang, Study of the Problem & Design and Implementation of Service System for Taxipooling, Chinese Master's Theses Full-text Database Engineering Science and Technology Series II, 2010, 73 pages.
Search Report in European Application No. 16891263.2 dated Mar. 26, 2018, 9 pages.
International Search Report in International Application No. PCT/CN2016/107351 dated Feb. 13, 2017, 4 pages.
Written Opinion in International Application No. PCT/CN2016/107351 dated Feb. 13, 2017, 4 pages.

* cited by examiner

400

```
┌─────────────────────────────────────┐
│ Obtaining a first transaction request│
│ associated with a first transportation│──410
│ service from a first service receiver at a│
│         first time point            │
└─────────────────────────────────────┘
                  │
                  ▼
┌─────────────────────────────────────┐
│ Obtaining a second transaction request│
│ associated with a second transportation│──420
│ service from a second service receiver│
│         at a second time point      │
└─────────────────────────────────────┘
                  │
                  ▼
┌─────────────────────────────────────┐
│ Obtaining service provider information of│──430
│         a service provider          │
└─────────────────────────────────────┘
                  │
                  ▼
┌─────────────────────────────────────┐
│ Generating an assignment strategy    │
│ associated with combining the first  │──440
│ transportation service and the second│
│ transportation service into a third  │
│       transportation service         │
└─────────────────────────────────────┘
                  │
                  ▼
┌─────────────────────────────────────┐
│ Sending the assignment strategy to the│──450
│         service provider            │
└─────────────────────────────────────┘
```

Determining direction information and route information according to the first transaction request and the second transaction request — 1010

Generating a matching result according to the direction information and the route information — 1020

- 1110 Determining a first direction, a second direction, a first sharing route, a second sharing route, a first original route and a second original route according to the first transaction request and the second transaction request

- 1120 Determining distance of the first sharing route, the second sharing route, the first original route and the second original route

- 1130 Determining an angle between the first direction and the second direction, a first ratio of the distance of the first sharing route and the distance of the first original route, and a second ratio of the distance of the second sharing route and the distance of the second original route

- 1140 Is the angle less than a fifth threshold? — No → 1180; Yes ↓

- 1150 Is the first ratio less than a sixth threshold? — No → 1180; Yes ↓

- 1160 Is the second ratio less than a seventh threshold? — No → 1180; Yes ↓

- 1170 Generating a matching result

- 1180 Generating a second strategy

FIG. 11

METHODS AND SYSTEMS FOR CARPOOLING

CROSS-REFERENCE TO RELATED APPLICATIONS

This present application is a continuation of International Application No. PCT/CN2016/107351, filed on Nov. 25, 2016, which claims priority of Chinese Patent Application No. 201610100973.1 filed Feb. 24, 2016, Chinese Patent Application No. 201610143434.6 filed Mar. 14, 2016, Chinese Patent Application No. 201610157715.7 filed Mar. 18, 2016 and Chinese Patent Application No. 201610171397.X filed Mar. 23, 2016, the contents of which are hereby incorporated by reference to their entirety.

TECHNICAL FIELD

The present disclosure generally relates to an on-demand service system, and more particularly, to methods and systems for carpooling.

BACKGROUND

A carpool service refers to an arrangement that combines two or more transportation services into a new transportation service. The carpool service may improve the traffic capacity. However, there are some problems such as inefficiency and a bad user experience in existing systems and methods for carpooling. Therefore, it is desirable to provide systems and methods for carpooling to improve the efficiency and the user experience.

SUMMARY

According to an aspect of the present disclosure, a system may include one or more storage media and one or more processors configured to communicate with the one or more storage media. The one or more storage media may include a set of instructions for carpooling. When the one or more processors executing the set of instructions, the one or more processors may be directed to perform one or more of the following operations. The one or more processors may obtain a first transaction request associated with a first transportation service of a first service receiver at a first time point. The one or more processors may obtain a second transaction request associated with a second transportation service of a second service receiver at a second time point. The one or more processors may obtain service provider information of a service provider. The one or more processors may determine an assignment strategy associated with combining the first transportation service and the second transportation service into a third transportation service according to at least one of the first transaction request, the second transaction request, and/or the service provider information. The one or more processors may send the assignment strategy to at least one of the first service receiver, the second service receiver and/or the service provider.

In some embodiments, the first transaction request may include at least one of a first origin and/or a first destination, the second transaction request may include at least one of a second origin and/or a second destination, and the service provider information may include at least one of a first location of the service provider at the first time point and/or a second location of the service provider at the second time point.

In some embodiments, the one or more processors may determine matching information according to at least one of the first transaction request, the second transaction request, and/or the service provider information. The matching information may include at least one of a variation in a travel direction of the service provider which has accepted the first transaction request when the service provider goes to the second origin of the second transaction request, direction information, route information, a matching probability, and/or a ratio between an estimated travel time associated with the third transportation service and an estimated travel time associated with the first transportation service. The one or more processors may determine a matching result according to the matching information. The one or more processors may determine a ranking result according to the matching result. The one or more processors may determine an assignment strategy according to the ranking result.

In some embodiments, the one or more processors may determine the direction information and the route information according to the first transaction request and the second transaction request.

In some embodiments, the one or more processors may determine a first direction of the first transaction request according to the first origin and the first destination, a second direction of the second transaction request according to the second origin and the second destination, a first sharing route of the first transaction request, a second sharing route of the second transaction request, a first original route of the first transaction request and a second original route of the second transaction request, wherein the first sharing route may be a route from the first origin to the first destination in the third transportation service, and the second sharing route may be a route from the second origin to the second destination in the third transportation service. The one or more processors may determine a length of the first sharing route, a length of the second sharing route, a length of the first original route and a length of the second original route. The one or more processors may determine a first angel between the first direction and the second direction, a second ratio of the length of the first sharing route to the length of the first original route and a third ratio of the length of the second sharing route to the length of the second original route.

In some embodiments, when the second transaction request of the second service receiver is obtained at the second time point, the first transaction request of the first service receiver may have been accepted by the service provider.

In some embodiments, the one or more processors may determine a first route according to the second location of the service provider at the second time point and the first destination of the first transaction request. The one or more processors may determine a second route according to the second origin of the second transaction request and the second destination of the second transaction request. The one or more processors may determine the variation in the travel direction of the service provider which has accepted the first transaction request when the service provider goes to the second origin of the second transaction request according to the first route and the second route.

In some embodiments, the one or more processors may determine a third route according to the second origin and the second destination and a fourth route according to the second location of the service provider at the second time point and the first destination. The one or more processors may obtain a first parameter according to the third route and the fourth route. The one or more processors may obtain a provider weight. The one or more processors may determine a matching probability according to the first parameter and the provider weight.

In some embodiments, the first parameter may include at least one of a distance between the second location of the service provider and the first origin, a distance between the second location of the service provider and the first destination, a second angle between the third route and the fourth route, a fourth ratio of a length of a third sharing route of the first transaction request to a length of a third original route, and/or a fifth ratio of a length of a fourth sharing route to a length of a fourth original route.

In some embodiments, the one or more processors may obtain a third transaction request associated with a fourth transportation service and a fourth transaction request associated with a fifth transportation service, wherein the third transportation service and the fourth transportation service may be combined into a sixth transportation service that has been completed by the service provider. The one or more processors may obtain a second parameter according to the third transaction request and the fourth transaction request. The one or more processors may determine the provider weight according to the second parameter.

In some embodiments, the one or more processors may determine a fourth route according to the first location of the service provider, the first origin and the first destination. The one or more processors may determine a first estimated time of the fourth route. The one or more processors may determine a fifth route according to at least one of the second location of the service provider, the second origin, the second destination, the first origin and/or the first destination. The one or more processors may determine a second estimated time of the fifth route. The one or more processors may determine the first ratio of the second estimated time to the first estimated time.

According to another aspect of the present disclosure, a method may include one or more of the following operations. A computer server of an online on-demand transportation service platform may obtain a first transaction request associated with a first transportation service of a first service receiver at a first time point. The computer server may obtain a second transaction request associated with a second transportation service of a second service receiver at a second time point. The computer server may obtain service provider information of a service provider. The computer server may determine an assignment strategy associated with combining the first transportation service and the second transportation service into a third transportation service according to at least one of the first transaction request, the second transaction request and/or the service provider information. The computer server may send the assignment strategy to at least one of the first service receiver, the second service receiver and/or the service provider.

In some embodiments, the first transaction request may include at least one of a first origin or a first destination, the second transaction request may include at least one of a second origin or a second destination, and the service provider information may include at least one of a first location of the service provider at the first time point and/or a second location of the service provider at the second time point.

In some embodiments, the computer server may determine matching information according to at least one of the first transaction request, the second transaction request and/or the service provider information. The matching information may include at least one of a variation in a travel direction of the service provider which has accepted the first transaction request when the service provider goes to the second origin of the second transaction request, direction information, route information, a matching probability, and/or a ratio between an estimated travel time associated with the third transportation service and an estimated travel time associated with the first transportation service. The computer server may generate a matching result according to the matching information. The computer server may generate a ranking result according to the matching result. The computer server may generate an assignment strategy according to the ranking result.

In some embodiments, the computer server may determine the direction information and the route information according to the first transaction request and the second transaction request.

In some embodiments, the computer server may determine a first direction of the first transaction request according to the first origin and the first destination, a second direction of the second transaction request according to the second origin and the second destination, a first sharing route of the first transaction request, a second sharing route of the second transaction request, a first original route of the first transaction request and a second original route of the second transaction request, wherein the first sharing route may be a route from the first origin to the first destination in the third transportation service, and the second sharing route may be a route from the second origin to the second destination in the third transportation service. The computer server may determine a length of the first sharing route, a length of the second sharing route, a length of the first original route and a length of the second original route. The computer server may determine a first angel between the first direction and the second direction, a second ratio of the length of the first sharing route to the length of the first original route and a third ratio of the length of the second sharing route to the length of the second original route.

In some embodiments, when the second transaction request of the second service receiver is obtained at the second time point, the first transaction request of the first service receiver may have been accepted by the service provider.

In some embodiments, the computer server may determine a first route according to the second location of the service provider at the second time point and the first destination of the first transaction request. The computer server may determine a second route according to the second origin of the second transaction request and the second destination of the second transaction request. The computer server may determine the variation in the travel direction of the service provider which has accepted the first transaction request when the service provider goes to the second origin of the second transaction request according to the first route and the second route.

In some embodiments, the computer server may determine a third route according to the second origin and the second destination and a fourth route according to the second location of the service provider at the second time point and the first destination. The computer server may obtain a first parameter according to the third route and the fourth route. The computer server may obtain a provider weight. The computer server may determine a matching probability according to the first parameter and the provider weight.

In some embodiments, the first parameter may include at least one of a distance between the second location of the service provider and the first origin, a distance between the second location of the service provider and the first destination, a second angle between the third route and the fourth route, a fourth ratio of a length of a third sharing route of the first transaction request to a length of a third original route, and/or a fifth ratio of a length of a fourth sharing route to a length of a fourth original route.

In some embodiments, the computer server may obtain a third transaction request associated with a fourth transportation service and a fourth transaction request associated with a fifth transportation service. The third transportation service and the fourth transportation service may be combined into a sixth transportation service that has been completed by the service provider. The computer server may obtain a second parameter according to the third transaction request and the fourth transaction request. The computer server may determine the provider weight according to the second parameter.

In some embodiments, the computer server may determine a fourth route according to the first location of the service provider, the first origin and the first destination. The computer server may determine a first estimated time of the fourth route. The computer server may determine a fifth route according to at least one of the second location of the service provider, the second origin, the second destination, the first origin and/or the first destination. The computer server may determine a second estimated time of the fifth route. The computer server may determine the first ratio of the second estimated time to the first estimated time.

BRIEF DESCRIPTION OF THE DRAWINGS

FIG. 4 is a flowchart illustrating an exemplary process of a carpool service according to some embodiments of the present disclosure.

FIG. 10 is a flowchart illustrating an exemplary process of determining matching information according to some embodiments of the present disclosure.

FIG. 11 is a flowchart illustrating an exemplary process of determining matching information according to some embodiments of the present disclosure.

DETAILED DESCRIPTION

Figure 1:
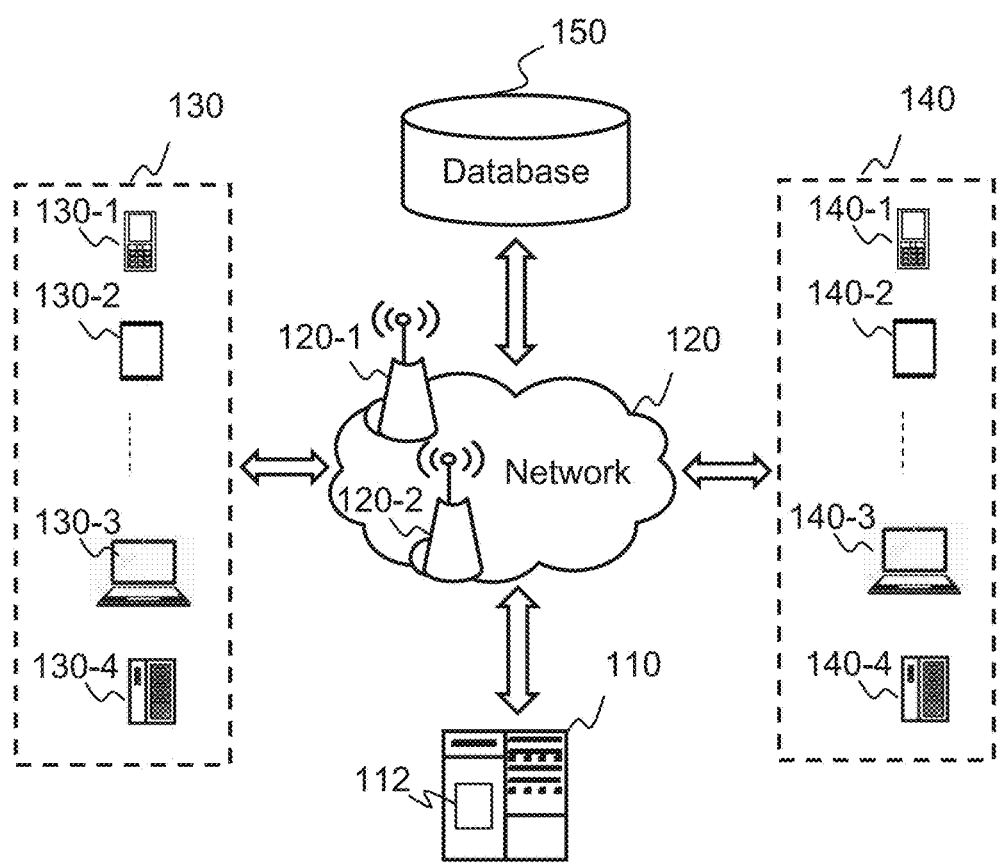
FIG. 1 is a block diagram of an exemplary on-demand service system 100 according to some embodiments.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily in regard to allocate a set of sharable orders, it should also be understood that this is only one exemplary embodiment. The system or method of the present disclosure may be applied to any other kind of on demand service. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system for management and/or distribution, for example, a system for sending and/or receiving an express. The application of the system or method of the present disclosure may include a webpage, a plug-in of a browser, a client terminal, a custom system, an internal analysis system, an artificial intelligence robot, or the like, or any combination thereof.

The term "passenger," "requester," "service requester," and "customer" in the present disclosure are used interchangeably to refer to an individual, an entity or a tool that may request or order a service. Also, the term "driver," "provider," "service provider," and "supplier" in the present disclosure are used interchangeably to refer to an individual, an entity or a tool that may provide a service or facilitate the providing of the service. The term "user" in the present disclosure may refer to an individual, an entity or a tool that may request a service, order a service, provide a service, or facilitate the providing of the service. For example, the user may be a passenger, a driver, an operator, or the like, or any combination thereof. In the present disclosure, "passenger" and "passenger terminal" may be used interchangeably, and "driver" and "driver terminal" may be used interchangeably.

The term "service request" and "order" in the present disclosure are used interchangeably to refer to a request that may be initiated by a passenger, a requester, a service requester, a customer, a driver, a provider, a service provider, a supplier, or the like, or any combination thereof. The service request may be accepted by any one of a passenger, a requester, a service requester, a customer, a driver, a provider, a service provider, or a supplier. The service request may be chargeable or free.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

An aspect of the present disclosure relates to online systems and methods for finding sharable and/or combinable transportation transactions, such as carpooling. The systems and methods may do so by determining matching information of a plurality of orders, determining a set of sharable orders based on the matching information, and allocating a set of sharable orders. The matching information may include at least one of a variation in travel direction of the service provider which has accepted the first transaction request when the service provider goes to an origin of a transaction request, direction information, route information, a matching probability or a ratio between an estimated travel time associated with the combined transportation service and an estimated travel time associated with the first transportation service.

It should be noted that online on-demand transportation service, such as online carpool service, is a new form of service rooted only in post-Internet era. It provides technical solutions to users and service providers that could raise only in post-Internet era. In pre-Internet era, when a user hails a taxi on street, the taxi request and acceptance occur only between the passenger and one taxi driver that sees the passenger. If the passenger hails a taxi through telephone call, the service request and acceptance may occur only between the passenger and one service provider (e.g., one taxi company or agent). If a driver wants to provider a carpool service, the driver has to ask a passenger face to face and determine whether the carpooling service is possible to be provided to the passenger by experience of the driver. Online carpool service, however, obtains transaction requests and finds combinable transaction requests in real-time and automatically. The carpool service also allows a user of the service to real-time and automatic distribute a service request to a vast number of individual service providers (e.g., taxi) distance away from the user and allows a plurality of service provides to respond to the service request simultaneously and in real-time. Therefore, through Internet, the online on-demand transportation systems may provide a much more efficient transaction platform for the users and the service providers that may never met in a traditional pre-Internet transportation service system.

FIG. 1 is a block diagram of an exemplary on-demand service system 100 according to some embodiments. For example, the on-demand service system 100 may be an online transportation service platform for transportation services such as taxi hailing, chauffeur service, express car, carpool, bus service, driver hire and shuttle service. The on-demand service system 100 may be an online platform including a server 110, a network 120, a requestor terminal 130, a provider terminal 140, and a database 150. The server 110 may include a processing engine 112.

In some embodiments, the server 110 may be a single server, or a server group. The server group may be centralized, or distributed (e.g., server 110 may be a distributed system). In some embodiments, the server 110 may be local or remote. For example, the server 110 may access information and/or data stored in the requestor terminal 130, the provider terminal 140, and/or the database 150 via the network 120. As another example, the server 110 may be directly connected to the requestor terminal 130, the provider terminal 140, and/or the database 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to the service request to perform one or more functions described in the present disclosure. For example, the processing engine 112 may determine a target vehicle based on the service request obtained from the requestor terminal 130. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components in the on-demand service system 100 (e.g., the server 110, the requestor terminal 130, the provider terminal 140, and the database 150) may send information and/or data to other component(s) in the on-demand service system 100 via the network 120. For example, the server 110 may obtain/acquire service request from the requestor terminal 130 via the network 120. In some embodiments, the network 120 may be any type of wired or wireless network, or combination thereof. Merely by way of example, the network 130 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the on-demand service system 100 may be connected to the network 120 to exchange data and/or information.

In some embodiments, a requestor may be a user of the requestor terminal 130. In some embodiments, the user of the requestor terminal 130 may be someone other than the requestor. For example, a user A of the requestor terminal 130 may use the requestor terminal 130 to send a service request for a user B, or receive service and/or information or instructions from the server 110. In some embodiments, a provider may be a user of the provider terminal 140. In some embodiments, the user of the provider terminal 140 may be someone other than the provider. For example, a user C of the provider terminal 140 may user the provider terminal 140 to receive a service request for a user D, and/or information or instructions from the server 110. In some embodiments, "requestor" and "requestor terminal" may be used interchangeably, and "provider" and "provider terminal" may be used interchangeably.

In some embodiments, the requestor terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, built-in device in the motor vehicle 130-4 may include an onboard computer, an onboard television, etc. In some embodiments, the requestor terminal 130 may be a device with positioning technology for locating the position of the requestor and/or the requestor terminal 130.

In some embodiments, the provider terminal 140 may be similar to, or the same device as the requestor terminal 130. In some embodiments, the provider terminal 140 may be a device with positioning technology for locating the position of the provider and/or the provider terminal 140. In some embodiments, the requestor terminal 130 and/or the provider terminal 140 may communicate with other positioning device to determine the position of the requestor, the requestor terminal 130, the provider, and/or the provider terminal 140. In some embodiments, the requestor terminal 130 and/or the provider terminal 140 may send positioning information to the server 110.

The database 150 may store data and/or instructions. In some embodiments, the database 150 may store data obtained from the requestor terminal 130 and/or the provider terminal 140. In some embodiments, the database 150 may store data and/or instructions that the server 110 may execute or use to perform exemplary methods described in the present disclosure. In some embodiments, database 150 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the database 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the database 150 may be connected to the network 120 to communicate with one or more components in the on-demand service system 100 (e.g., the server 110, the requestor terminal 130, the provider terminal 140, etc.). One or more components in the on-demand service system 100 may access the data or instructions stored in the database 150 via the network 120. In some embodiments, the database 150 may be directly connected to or communicate with one or more components in the on-demand service system 100 (e.g., the server 110, the requestor terminal 130, the provider terminal 140, etc.). In some embodiments, the database 150 may be part of the server 110.

In some embodiments, one or more components in the on-demand service system 100 (e.g., the server 110, the requestor terminal 130, the provider terminal 140, etc.) may have a permission to access the database 150. In some embodiments, one or more components in the on-demand service system 100 may read and/or modify information relating to the requestor, provider, and/or the public when one or more conditions are met. For example, the server 110 may read and/or modify one or more users' information after a service. As another example, the provider terminal 140 may access information relating to the requestor when receiving a service request from the requestor terminal 130, but the provider terminal 140 may not modify the relevant information of the requestor.

In some embodiments, information exchanging of one or more components in the on-demand service system 100 may be achieved by way of requesting a service. The object of the service request may be any product. In some embodiments, the product may be a tangible product, or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

Figure 2:
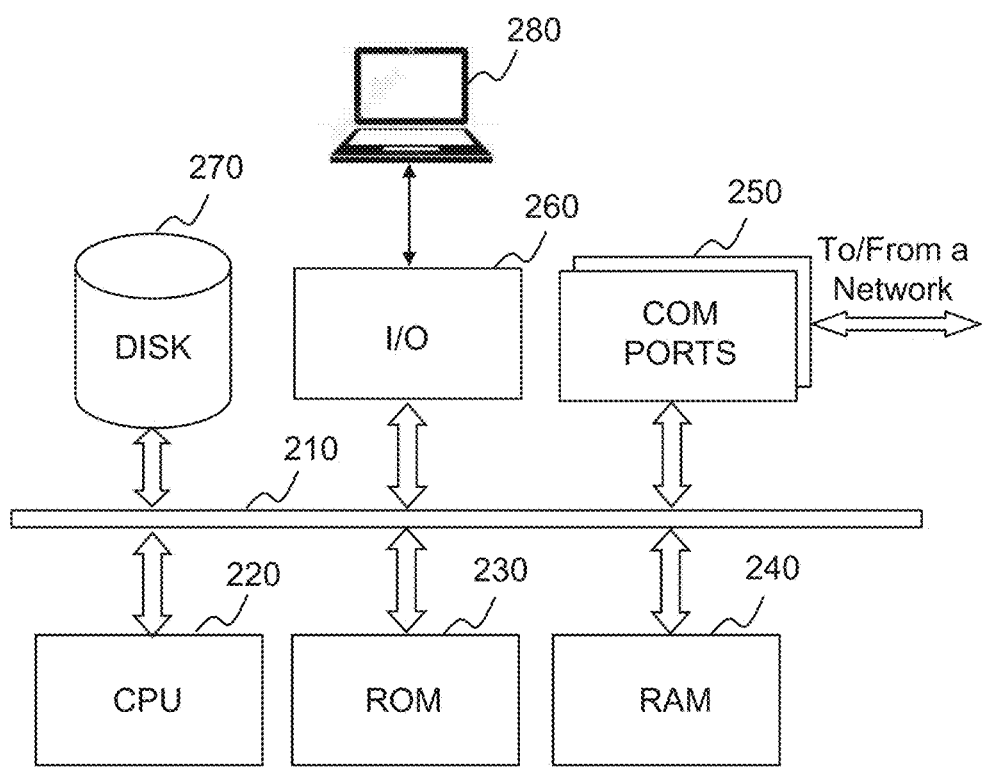
FIG. 2 is a schematic diagram illustrating exemplary hardware and software components of a computing device 200 according to some embodiments of the present disclosure.

FIG. 2 is a schematic diagram illustrating exemplary hardware and software components of a computing device 200 on which the server 110, the requestor terminal 130, and/or the provider terminal 140 may be implemented according to some embodiments of the present disclosure. For example, the processing engine 112 may be implemented on the computing device 200 and configured to perform functions of the processing engine 112 disclosed in this disclosure.

The computing device 200 may be a general purpose computer or a special purpose computer, both may be used to implement an on-demand system for the present disclosure. The computing device 200 may be used to implement any component of the on-demand service as described herein. For example, the processing engine 112 may be implemented on the computing device 200, via its hardware, software program, firmware, or a combination thereof. Although only one such computer is shown, for convenience, the computer functions relating to the on-demand service as described herein may be implemented in a distributed fashion on a number of similar platforms, to distribute the processing load.

The computing device 200, for example, may include COM ports 250 connected to and from a network connected thereto to facilitate data communications. The computing device 200 may also include a central processing unit (CPU) 220, in the form of one or more processors, for executing program instructions. The exemplary computer platform may include an internal communication bus 210, program storage and data storage of different forms, for example, a disk 270, and a read only memory (ROM) 230, or a random access memory (RAM) 240, for various data files to be processed and/or transmitted by the computer. The exemplary computer platform may also include program instructions stored in the ROM 230, RAM 240, and/or other type of non-transitory storage medium to be executed by the CPU 220. The methods and/or processes of the present disclosure may be implemented as the program instructions. The computing device 200 also includes an I/O component 260, supporting input/output between the computer and other components therein such as user interface elements 280. The computing device 200 may also receive programming and data via network communications.

Merely for illustration, only one CPU and/or processor is described in the computing device 200. However, it should be note that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
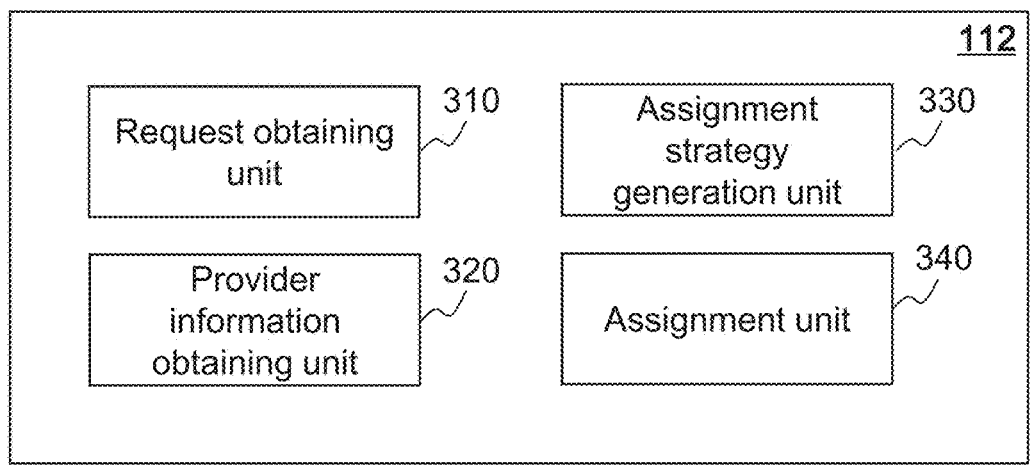
FIG. 3 is a block diagram illustrating an exemplary architecture of processing engine 112 according to some embodiments of the present disclosure.

FIG. 3 is a block diagram illustrating an exemplary architecture of processing engine 112 according to some embodiments of the present disclosure. As illustrated, processing engine 112 may include a request obtaining unit 310, a provider information obtaining unit 320, an assignment strategy generation unit 330 and an assignment unit 340.

Request obtaining unit 310 may be configured to obtain a transaction request associated with a transportation service from a service receiver. In some embodiments, the transportation service may be a service of taking an object from one place to another in a vehicle. The object may include passengers and/or goods. The vehicle may include a non-motor vehicle (e.g., a bicycle or a tricycle), a motor vehicle (e.g., a car or a truck), a watercraft (e.g., a ship or a boat) and/or an aircraft. For example, the transportation service may be a taxi service or a delivery service.

In some embodiments, the transaction request of the service receiver may include an origin of the transaction request (e.g., a pickup location of a taxi service), a destination of the transaction request, receiver contact information (e.g., a phone number and/or an email address), object information (e.g., the number of passengers and/or the volume of goods), information of whether to agree to combine the transportation service with another transportation service, or the like, or any combination thereof.

Provider information obtaining unit 320 may be configured to obtain service provider information of a service provider. In some embodiments, the service provider information may include a location of the service provider, provider contact information (e.g., a phone number and/or an email address), the name of the service provider, the plate number of the service provider, the capacity of the service provider (e.g., the passenger capacity and/or the goods capacity), or the like, or any combination thereof.

In some embodiments, the service provider and/or the service receiver may use a device to communicate with the on-demand service system 100 through network 120. The device may include a desktop, an All-in-One personal computer (AIO), a notebook, a smartphone, a Personal Digital Assistant (PDA), a tablet, a carputer, a handheld game player, a wearable device (e.g., smart glasses or smartwatch), a virtual display device (e.g., Oculus Rift or Gear VR), a augmented display device (e.g., Google Glass, Hololens), or the like, or any combination thereof.

Assignment strategy generation unit 330 may be configured to generate an assignment strategy associated with combining two or more transportation services into a new transportation service. In some embodiments, the assignment strategy may include a first strategy that is to combine the two or more transportation services into a new transportation service and/or a second strategy that is not to combine the two or more transportation services into a new transportation service.

Assignment unit 340 may be configured to send the assignment strategy to at least one of the service provider or the two or more service receivers.

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the acquisition module 302 may be integrated in the determination module 304 as a single module which may both obtain features of orders and determine matching information of the orders.

FIG. 4 is a flowchart illustrating an exemplary process of a carpool service according to some embodiments of the present disclosure. The carpool service may refer to an arrangement that combines two or more transportation services into a new transportation service. In this disclosure, a carpool service of combining two transportation services into a new transportation service is taken for example. It should be noted that the carpool service of combining two transportation services into a new transportation service is merely provided for the purposes of illustration, and not intended to limit the scope of the present disclosure. In some embodiments, this disclosure may be applied to a carpool service of combining more than two transportation services into a new transportation service.

In step 410, request obtaining unit 310 may obtain a first transaction request requesting a first transportation service. The request obtaining unit 310 may receive the first transaction request from a first service receiver at a first time point.

In step 420, request obtaining unit 310 may obtain a second transaction request requesting a second transportation service. The request obtaining unit 310 may receive the second transaction request from a second service receiver at a second time point.

In some embodiments, the first transportation service and the second transportation service may be of the same type of services. For example, both the first transportation service and the second transportation service may be taxi service. In some embodiments, the first transportation service and the second transportation service may be different type of services. For example, the first transportation service may be a taxi service, and the second transportation service may be a freight shipping service.

In some embodiments, the first transaction request may include a first origin and/or a first destination, and the second transaction request may include a second origin and/or a second destination.

In some embodiments, the first time point may be earlier than the second time point. In some embodiments, the first time point may be later than the second time point. In some embodiments, the first time point may be equal to the second time point.

The first transaction request and/or the second transaction request may include a real-time transaction request, an appointment transaction request, or a pending transaction request. As used herein, a real-time transaction request may be a transaction request that the requestor wishes to conduct the requested transaction (e.g., transportation service) at the present moment or at a defined time reasonably close to the present moment for an ordinary person in the art. For example, a transaction request may be a real-time transaction request if the defined time is shorter than a threshold value, such as 1 minute, 5 minutes, 10 minutes or 20 minutes. The appointment transaction request may refer to that the requestor wishes to conduct the requested transaction at a defined time which is reasonably far from the present moment for the ordinary person in the art. For example, a transaction request may be an appointment transaction request if the defined time is longer than a threshold value, such as 20 minutes, 2 hours, or 1 day. In some embodiments, the processing engine 112 may define the real-time transaction request or the appointment transaction request based on a time threshold. The time threshold may be default settings of the system 100, or may be adjustable depending on different situations. For example, in a traffic peak period, the time threshold may be relatively small (e.g., 10 minutes), otherwise in idle period (e.g., 10:00-12:00 am), the time threshold may be relatively large (e.g., 1 hour). The pending transaction request may be an on-going transaction request which has not yet been accepted by a service provider at the present moment.

In some embodiments, suppose that the first time point is earlier than the second time point, the first transaction request has been accepted by a service provider and the second transaction request has not been accepted, request obtaining unit 310 may obtain a second transaction request of which the origin is in a certain area according to the location of the service provider at the first time. For example, the distance between the second origin and the location of the service provider at the first time point may be less than a first threshold (e.g., 3 kilometer). As another example, if the location of the service provider at the first time point is in, for example, Manhattan, New York City, request obtaining unit 310 may obtain a second transaction request of which the origin is in Manhattan.

In some embodiments, suppose that the first time point is later than the second time point, the first transaction request has been accepted by a service provider and the second transaction request has not been accepted, request obtaining unit 310 may obtain a first transaction request of which the location of the service provider at the first time is in a certain area according to the origin of the second transaction request. For example, the distance between the second origin and the location of the service provider at the first time point may be less than a first threshold (e.g., 3 kilometer). As another example, if the origin of the second transaction request is in, for example, Manhattan, request obtaining unit 310 may obtain a first transaction request of which the location of the service provider at the first time point is in Manhattan.

In some embodiments, if there are no transaction requests in the certain area, request obtaining unit 310 may obtain a transaction request in another area. Additionally or alternatively, request obtaining unit 310 may obtain a transaction request after a period of time (e.g., 1 minute).

Alternatively, request obtaining unit 310 may obtain transaction requests in any area.

In some embodiments, the transaction request may include information of whether the requestor agrees to combine the transportation service with another transportation service. Accordingly, request obtaining unit 310 may obtain a transaction request that agrees to combine the transportation service with another transportation service. However, if the transaction request does not include the information of whether to agree to combine the transportation service with another transportation service, after obtaining the transaction request, the on-demand service system 100 may send a message to the service receiver to determine whether the service receiver agrees to combine the transportation service with another transportation service.

In step 430, provider information obtaining unit 320 may obtain service provider information of a service provider. The location of the service provider may include a first location at the first time point and/or a second location at the second time point. The first location at the first time point may be the location of the service provider when the first transaction request is obtained by request obtaining unit 310, and the second location at the second time point may be the location of the service provider when the second transaction request is obtained by request obtaining unit 310.

In step 440, assignment strategy generation unit 330 may generate an assignment strategy to combine the first transportation service and the second transportation service into a third transportation service.

In some embodiments, the assignment strategy may include a first strategy or a second strategy. The first strategy may include combining the first transportation service and the second transportation service into the third transportation service. It may include the first origin, the first destination, the second origin, the second destination, the service receiver information, the service provider information, or the like, or any combination thereof. Under the second strategy, the first transportation service and the second transportation service may not be combined into the third transportation service. The second strategy may instead include combining the first transportation service or the second transportation service with a fourth transportation service associated with a fourth transaction request. Alternatively or additionally, the second strategy may include assigning the first transaction request or the second transaction request to an idle service provider, i.e., a service provider that is not serving anyone.

In step 450, assignment unit 340 may send the assignment strategy to at least one of the service provider, the first service receiver or the second service receiver.

In some embodiments, assignment strategy generation unit 330 may determine whether two pending transaction requests are combinable. For example, the first transaction request and the second transaction request may be pending transaction requests. In some embodiments, assignment strategy generation unit 330 may determine whether an acceptable transaction request and a pending transaction request are combinable. For example, the first transaction request may be an acceptable transaction request, and the second transaction request may be a pending transaction request. Here, the accepted request may refer to a transaction request that has been accepted by a service provider. The pending request may refer to a transaction request that has not been accepted by a service provider In some embodiments, request obtaining unit 310 may obtain one accepted transaction request and one pending transaction request. Assignment strategy generation unit 330 may determine whether the two transportation services associated with the two transaction requests are possible to be combined into a new transportation service. If the answer is "yes", that is, the two transportation service associated with the two transaction requests is possible to be combined into a new transportation service, assignment strategy generation unit 330 may generate the first strategy. If the answer is "no", that is, the two transportation service associated with the two transaction requests is not possible to be combined into a new transportation service, assignment strategy generation unit 330 may generate the second strategy, and/or request obtaining unit 310 may obtain another accepted request and/or another pending request.

In some embodiments, request obtaining unit 310 may obtain one accepted transaction request and more than one pending transaction requests. Assignment strategy generation unit 330 may select a pending transaction request from the more than one pending transaction requests. The on-demand service system 100 may combine the transportation service associated with the selected pending transaction request with the transportation service associated the accepted transaction.

In some embodiments, request obtaining unit 310 may obtain one pending transaction request and more than one accepted transaction requests. Assignment strategy generation unit 330 may select an accepted transaction request from the more than one accepted transaction requests. The on-demand service system 100 may combine the transportation service associated with the selected accepted transaction request with the transportation service associated with the pending transaction request.

In some embodiments, request obtaining unit 310 may obtain two or more pending transaction requests. Assignment strategy generation unit 330 may select one or more first groups of pending requests. The first group of pending requests may include two pending requests with which the two transportation services associated are used to be combined into a new transportation service.

In some embodiments, assignment strategy generation unit 330 may select and determine a service provider to provide the new transportation service to the first group. In some embodiments, request obtaining unit 310 may obtain more than one pending transaction requests and more than one accepted requests. Assignment strategy generation unit 330 may determine one or more second group. The second group may include one pending transaction request and one accepted transaction request. The transportation service associated with the pending transaction request and the transportation service associated with the accepted transaction request may be combined into a new transportation service.

Figure 5:
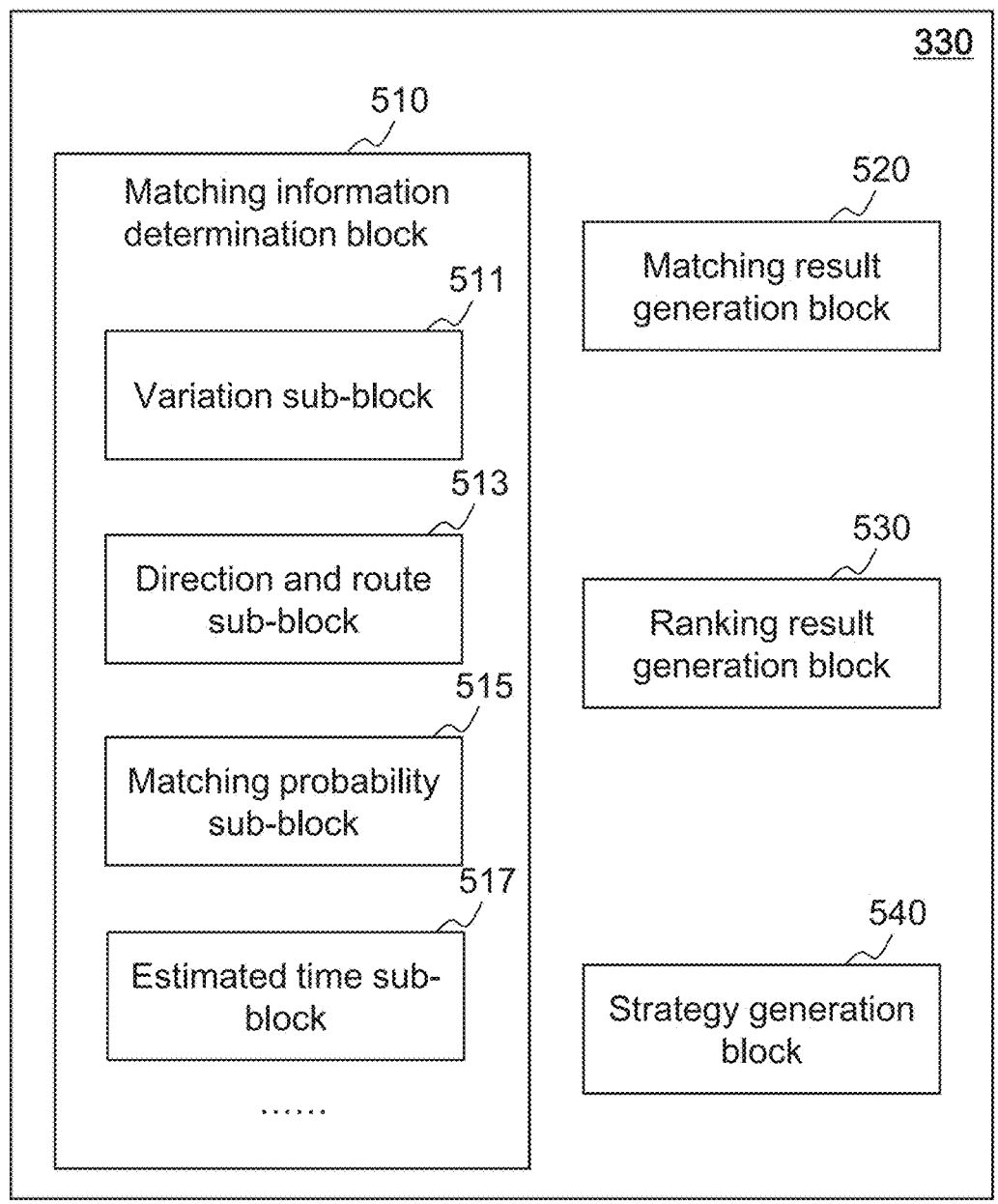
FIG. 5 is a block diagram illustrating an exemplary architecture of an assignment strategy generation unit 330 according to some embodiments of the present disclosure.

FIG. 5 is a block diagram illustrating an exemplary architecture of an assignment strategy generation unit 330 according to some embodiments of the present disclosure. As illustrated, assignment strategy generation unit 330 may include a matching information determination block 510, a matching result generation block 520, a ranking result generation block 530 and a strategy generation block 540.

Matching information determination block 510 may be configured to determine matching information. In some embodiments, the matching information may be used to determine a candidate transaction request of a service receiver associated with a transportation service that is possible to be combined with another transportation service. In some embodiments, the matching information may include a variation in travel direction of the service provider which has accepted the first transaction request when the service provider goes to an origin of a transaction request, direction information, route information, a matching probability, a ratio between an estimated travel time associated with the third transportation service (i.e., the combined transportation transaction of the first transportation service and the second transportation service) and an estimated travel time associated with the first transportation service, or the like, or any combination thereof.

In some embodiments, matching information determination block 510 may include a plurality of sub-blocks configured to determine the matching information. For example, matching information determination block 510 may include a variation sub-block 511, a direction and route sub-block 513, a matching probability sub-block 515 and an estimated time sub-block 517. Variation sub-block 511 may configured to determine a variation in travel direction of the service provider which has accepted the first transaction request when the service provider goes to an origin of a transaction request. Direction and route sub-block 513 may be configured to determine direction information and route information. Matching probability sub-block 515 may be configured to determine a matching probability. Estimated time sub-block 517 may be configured to determine a ratio between an estimated travel time associated with the third transportation service and an estimated travel time associated with the first transportation service. In some embodiments, matching information determination block 510 may include other sub-blocks configured to determine other matching information.

Matching result generation block 520 may be configured to generate a matching result according to the matching information. In some embodiments, the matching result may be a group of candidate transaction requests of service receivers.

Ranking result generation block 530 may be configured to generation a ranking result according to the matching result. In some embodiments, the ranking result may be a transaction request of a service receiver associated with a transportation service that is used to combine with another transportation service. The transaction request of the ranking result may be selected from the matching result.

Strategy generation block 540 may be configured to generate an assignment strategy according to the ranking result.

Figure 6:
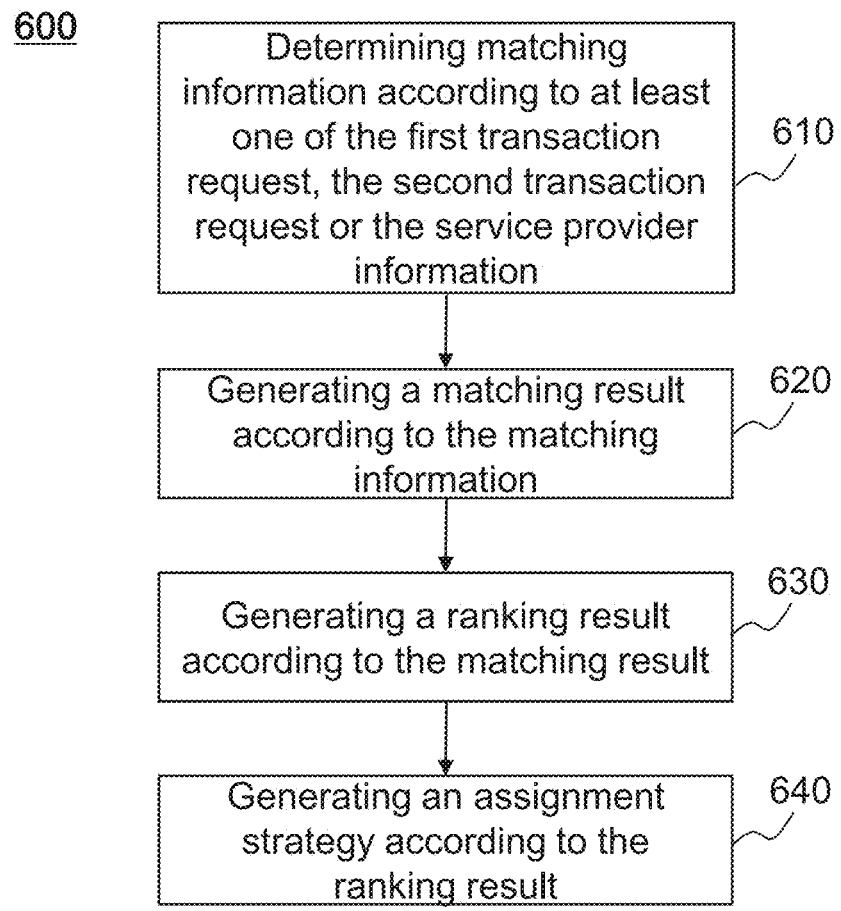
FIG. 6 is a flowchart illustrating an exemplary process of generating an assignment strategy according to some embodiments of the present disclosure.

FIG. 6 is a flowchart illustrating an exemplary process of generating an assignment strategy according to some embodiments of the present disclosure. In some embodiments, process 600 may generate the assignment strategy in step 440 of process 400.

In step 610, matching information determination block 510 may determine matching information according to the first transaction request and the second transaction request. In some embodiments, the matching information may be used to determine a candidate transaction request of a service receiver associated with a transportation service that is possible to be combined with another transportation service. In some embodiments, the matching information may include a variation in travel direction of the service provider which has accepted the first transaction request when the service provider goes to an origin of a transaction request, direction information, route information, a matching probability, a ratio between an estimated travel time associated with the third transportation service and an estimated travel time associated with the first transportation service, or the like, or any combination thereof. In some embodiments, the matching information may be determined according to at least one of the location of the service provider, the first origin, the first destination, the second origin or the second destination.

In step 620, matching result generation block 520 may generate a matching result according to the matching information. In some embodiments, the matching result may be generated by determining whether the matching information satisfies one or more conditions. For example, if the matching information of a transaction request is the matching probability, the condition may be that the matching probability is higher than a second threshold. If the matching probability is higher than the second threshold, the transaction request may be regarded as a candidate transaction request. As another example, if the matching information of a transaction request is the ratio between an estimated travel time associated with the third transportation service and an estimated travel time associated with the first transportation service, the condition may be that the ratio is less than a third threshold. If the ratio is less than the third threshold, the transaction request may be regarded as a candidate transaction request.

In some embodiments, if request obtaining unit 310 obtains one accepted transaction request and more than one pending transaction requests, matching result generation block 520 may select one or more candidate transaction requests from the more than one pending transaction requests. If request obtaining unit 310 obtains one pending transaction request and more than one accepted transaction requests, matching result generation block 520 may select one or more candidate transaction requests from the more than one accepted transaction requests.

In some embodiments, if there is no candidate transaction request in the matching result, request obtaining unit 310 may obtain one or more transaction requests in another area. Additionally or alternatively, request obtaining unit 310 may obtain one or more transaction requests after a period of time (e.g., after 1 minute).

In step 630, ranking result generation block 530 may generate a ranking result according to the matching result. In some embodiments, the candidate transaction requests in the matching result may be ranked. For example, if the matching information is the matching probability, the ranking result may be the transaction request of which the matching probability is the highest. As another example, if the matching information is the direction information and the route information, a score may be determined according to the direction information, the route information, a weight of the direction information and a weight of the route information. The ranking result may be the transaction request of which the score is the highest.

In some embodiments, if the number of the candidate transaction requests in the matching result is less than or equal to 1, step 630 may be omitted.

In step 640, strategy generation block 540 may generate an assignment strategy according to the ranking result. In some embodiments, a first strategy that is to combine the first transportation service and the second transportation service into the third transportation service may be generated according to the ranking result. A second strategy that is not to combine the first transportation service and the second transportation service into the third transportation service may be generated according to other transaction requests obtained by request obtaining unit 310. The other transaction requests may be combined with a fourth transaction request associated with a fourth transportation service or be assigned to a service provider that is not providing a transportation service.

Figure 7:
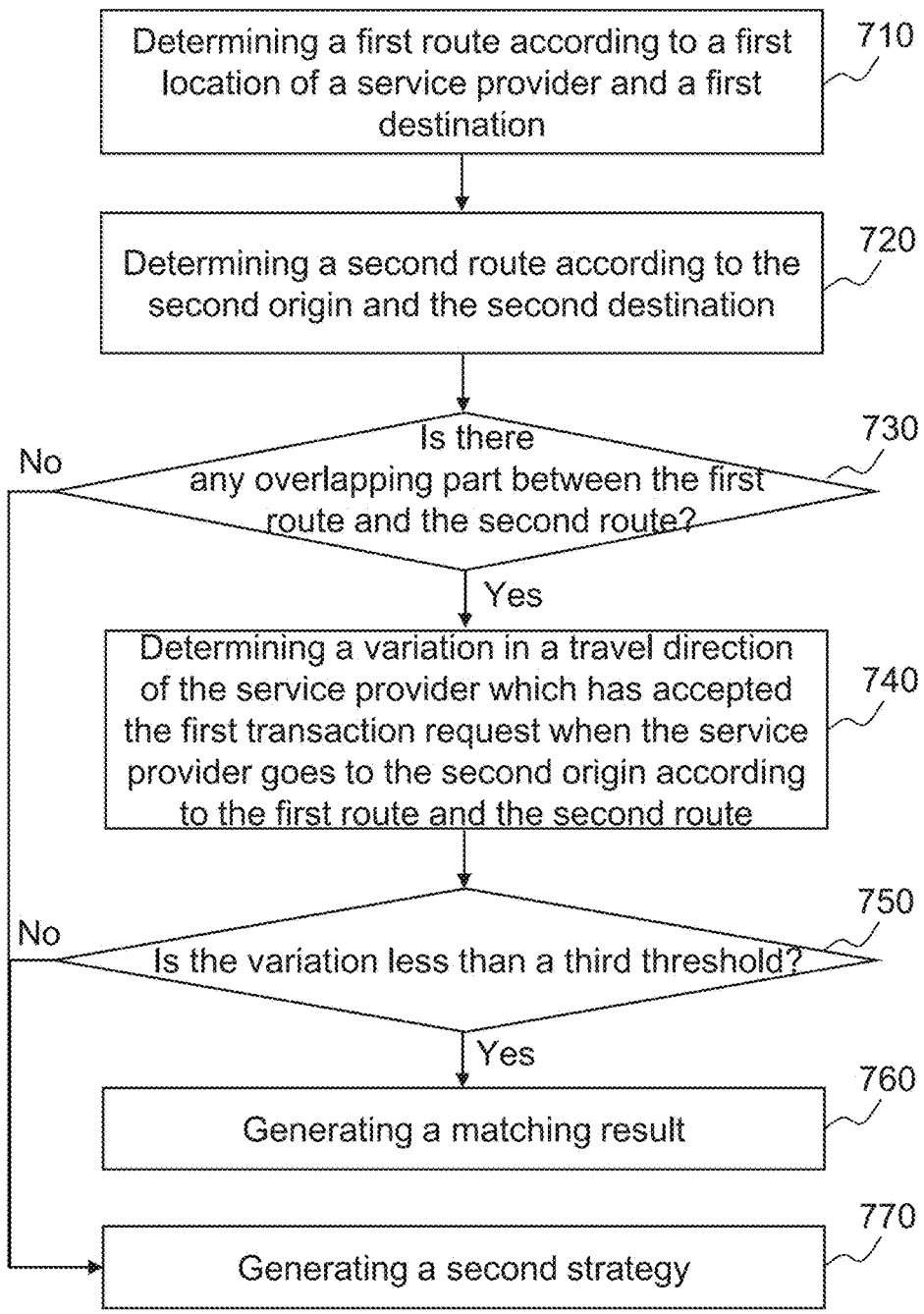
FIG. 7 is a flowchart illustrating an exemplary process of determining matching information according to some embodiments of the present disclosure.

FIG. 7 is a flowchart illustrating an exemplary process of determining matching information according to some embodiments of the present disclosure. In some embodiments, process 700 may be used for determining the matching information in 610 of process 600.

In this case, the first transaction request may be obtained at the first time point, and the second transaction request may be obtained at the second time point. The first time point may be earlier than the second time point. The first transaction request may be an accepted request at the second time point, and the second transaction request may be a pending transaction request at the second time point.

In step 710, variation sub-block 511 may determine a first route according to the first location of the service provider that accepts the first transaction request and the first destination.

In step 720, variation sub-block 511 may determine a second route according to the second origin and the second destination.

In some embodiments, if there are more than one routes according to the first location of the service provider and the first destination or according to the second origin and the second destination, variation sub-block 511 may select one route that satisfies a condition. The condition may include that the length of the route is the shortest, the traveling time of the route is the least, the traffic lights in the route are least, or the like, or any combination thereof.

In step 730, variation sub-block 511 may determine whether there is any overlapping part between the first route and the second route. If the answer is "yes", that is, there is at least one overlapping part between the first route and the second route, the process may proceed to step 740. If the answer is "no", that is, there is no overlapping part between the first route and the second route, the process may proceed to step 770 to generate a second strategy that is not to combine the first transportation service associated with the first transaction request and the second transportation service associated with the second transaction request into the third transportation service by strategy generation block 540.

Figure 8:
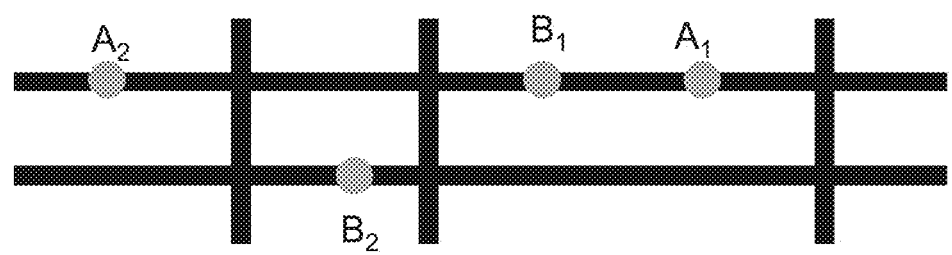
FIG. 8 and FIG. 9 are exemplary diagrams illustrating a variation of the travel direction of a service provider according to some embodiments of the present disclosure.
Figure 9:
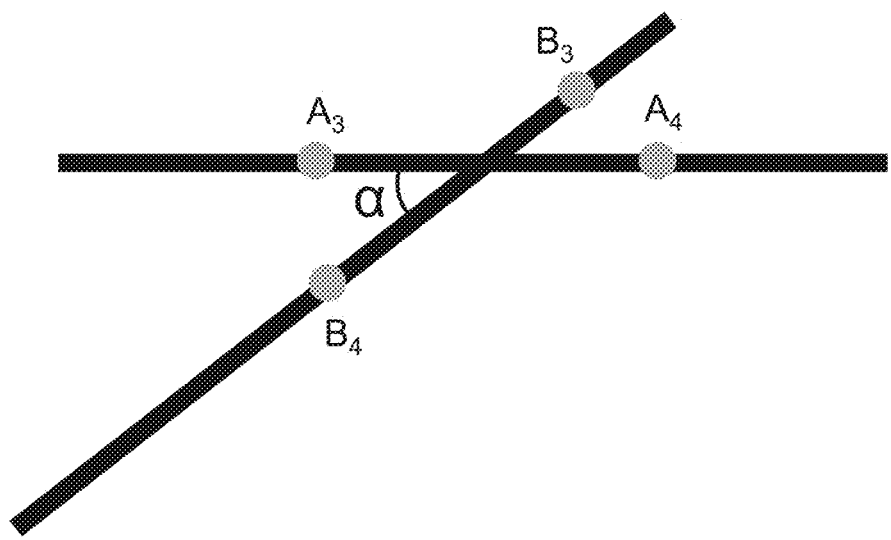

In step 740, variation sub-block 511 may determine a variation in travel direction of the service provider which has accepted the first transaction request when the service provider goes to the second origin according to the first route and the second route. In some embodiments, the service provider may change the travel direction to pick up the second service receiver from the second origin. As illustrated in FIG. 8, if the service provider is in the location of $A_1$ when request obtaining unit 310 obtains the second transaction request at the second time point, the variation in travel direction of the service provider may be 180° (e.g., a U-turn) when the service provider goes to the second origin $B_1$ or $B_2$. If the service provider is in the location of $A_2$ when request obtaining unit 310 obtains the second transaction request at the second time point, the variation in travel direction of the service provider may be 0° when the service provider goes to the second origin $B_1$ or $B_2$. As illustrated in FIG. 9, if the service provider is in the location of $A_3$ when request obtaining unit 310 obtains the second transaction request at the second time point, the variation in travel direction of the service provider may be α when the service provider goes to the second origin $B_3$, and the variation in travel direction of the service provider may be 180−α when the service provider goes to the second origin service provider goes to the second origin $B_4$. If the service provider is in the location of $A_4$ when request obtaining unit 310 obtains the second transaction request at the second time point, the variation in travel direction of the service provider may be 360°−α when the service provider goes to the second origin $B_3$, and the variation in travel direction of the service provider may be 180°+α when the service provider goes to the second origin $B_4$. It should be noted that the description in FIG. 8 and FIG. 9 is merely provided for the purposes of illustration, and not intended to limit the scope of the present disclosure.

In step 750, matching result generation block 520 may determine whether the variation is less than a third threshold. If the answer is "yes", that is, the variation is less than the third threshold, the process may proceed to step 760 to generate a matching result by matching result generation block 520. If the answer is "no", that is, the variation is larger than or equal to the third threshold, the process may proceed to step 770. In some embodiments, the third threshold may be 180°.

In some embodiments, the variation may be determined by a variation model. The variation model may be obtained by training historical data in a period of time. The historical data may be one or more transaction requests associated with one or more transportation services that are successfully combined with some other transportation services. The period of time may include 1 hour, 1 day, 2 days, 1 week, 1 month, or the like. In some embodiments, the variation model may be obtained by using a linear regression model to train the historical data in a period of time. The linear regression model may include a logistic regression model, a support vector machine model (SVM), a least square model, or the like, or any combination thereof. The logistic regression model may be represented as Equation (1) and Equation (2) as below:

$$P(Y = 1 \mid X = x) = \frac{1}{1 + e^{-W*x}}, \quad \text{Equation (1)}$$

$$P(Y = 0 \mid X = x) = 1 - \frac{1}{1 + e^{-W*x}}, \quad \text{Equation (2)}$$

wherein, in this case, X is a variation variable, and refers to the variation in travel direction of the service provider when the service provider goes to the second origin, Y is a target variable, the equation Y=1 refers that the first transportation service associated with the first transaction request and the second transportation service associated with the second transaction request are combined into the third transportation service, the equation Y=0 refers that the first transportation service associated with the first transaction request and the second transportation service associated with the second transaction request are not combined into the third transportation service, P refers to a probability that the first transportation service associated with the first transaction request and the second transportation service associated with the second transaction request are not combined into the third transportation service, and W refers to a regression coefficient.

In some embodiments, steps 740 and 750 may be performed after step 720, and step 730 may be performed after step 730. In some embodiments, step 710 and step 720 may be performed in any order. Step 710 may be performed before step 720. Step 710 may be performed after step 720. Step 710 and step 720 may be performed at the same time.

In some embodiments, process 700 may further include a step of determining whether the length of the overlapping part is larger than a fourth threshold. In some embodiments, step 730 may be omitted.

FIG. 10 is a flowchart illustrating an exemplary process of determining matching information according to some embodiments of the present disclosure. In some embodiments, process 1000 may be used for determining the matching information in 610 of process 600.

In this case, the first transaction request may be obtained at the first time point, and the second transaction request may be obtained at the second time point. The first time point may be earlier than or equal to the second time point. The first transaction request may be an accepted request or a pending request at the second time point, and the second transaction request may be a pending transaction request at the second time point.

In step 1010, direction and route sub-block 513 may determine direction information and route information according to the first transaction request and the second transaction request. In some embodiments, the direction information may include a first direction of the first transaction request, a second direction of the second transaction request, a first angle between the first direction and the second direction, or the like, or any combination thereof. The route information may include a first sharing route, a first original route, a second sharing route, a second original route, the length of the first sharing route, the length of the first original route, the length of the second sharing route, the length of the second original route, a first ratio of the length of the first sharing route to the length of the first original route, a second ratio of the length of the second sharing route to the length of the second original route, or the like, or any combination thereof. In some embodiments, the first original route may be a route from the first origin to the first destination in the first transportation service, the second original route may be a route from the second origin to the second destination in the second transportation service, the first sharing route may be a route from the first origin to the first destination in the third transportation service, and the second sharing route may be a route from the second origin to the second destination in the third transportation service.

In step 1020, matching result generation block 520 may generate a matching result according to the direction information and the route information.

FIG. 11 is a flowchart illustrating an exemplary process of determining matching information according to some embodiments of the present disclosure. In some embodiments, process 1100 may be used for determining the direction information and the route information in 1010 of process 1000 and generating the matching result in 1020 of process 1000.

In step 1110, direction and route sub-block 513 may determine a first direction of the first transaction request, a second direction of the second transaction request, a first sharing route, a first original route, a second sharing route and a second original route according to the first transaction request and the second transaction request.

In some embodiments, a direction of a transaction request may be a vector determined by the origin of the transaction request and the destination of the transaction request, and the direction of the vector may be from the origin to the destination. The first direction may be determined according to the first origin and the first destination, and the second direction may be determined according to the second origin and the second destination.

The first original route may be determined according to the first origin and the first destination. The second original route may be determined according to the second origin and the second destination.

If the on-demand transportation service system 100 determine to combine the first transportation service associated with the first transaction request with the second transportation service associated with the second transaction request, the system 100 may determine a sharing route according to the first origin, the first destination, the second origin and the second destination. The sharing route may include the first sharing route and the second sharing route.

In step 1120, direction and route sub-block 513 may determine the length of the first sharing route, the length of the second sharing route, the length of the first original route and the length of the second original route.

In step 1130, direction and route sub-block 513 may determine a first angle between the first direction and the second direction, a first ratio of the length of the first sharing route to the length of the first original route, and a second ratio of the length of the second sharing route to the length of the second original route. Here, the first ratio may be used to measure the extent of detour of the first transaction request when the first transportation service is combined with the second transportation service, and the second ratio may be used to measure the extent of detour of the second transaction request when the first transportation service is combined with the second transportation service.

In step 1140, matching result generation block 520 may determine whether the first angle is less than a fifth threshold. If the answer is "yes", that is, the first angle is less than the fifth threshold, the process may proceed to step 1150. If the answer is "no", that is, the first angle is larger than or equal to the fifth threshold, the process may proceed to step 1180 to generate a second strategy by strategy generation block 540.

In step 1150, matching result generation block 520 may determine whether the first ratio is less than a sixth threshold. If the answer is "yes", that is, the first ratio is less than the sixth threshold, the process may proceed to step 1160. If the answer is "no", that is, the first ratio is larger than or equal to the sixth threshold, the process may proceed to step 1180 to generate a second strategy.

In step 1160, matching result generation block 520 may determine whether the second ratio is less than a seventh threshold. If the answer is "yes", that is, the second ratio is less than the seventh threshold, the process may proceed to step 1170 to generate a matching result by matching result generation block 520. If the answer is "no", that is, the second ratio is larger than or equal to the seventh threshold, the process may proceed to step 1180 to generate a second strategy.

In some embodiments, step 1140, step 1150 and step 1160 may be performed in any order.

Steps 1110-1130 may be used for determining the direction information and the route information in 1010 of process 1000. Steps 1140-1170 may be used for generating the matching result in 1020 of process 1000.

Figure 12:
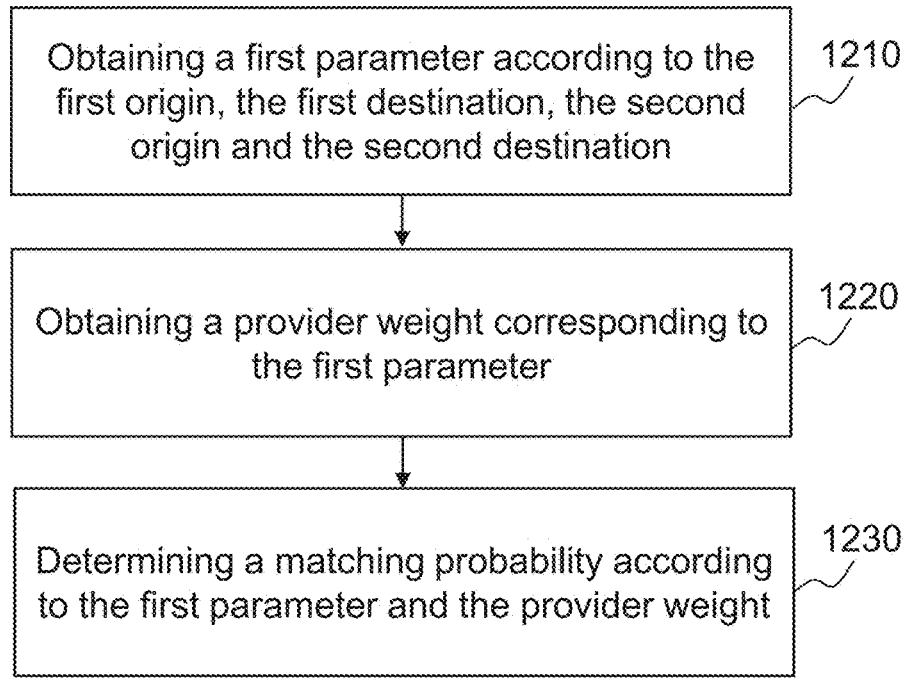
FIG. 12 is a flowchart illustrating an exemplary process of determining matching information according to some embodiments of the present disclosure.

FIG. 12 is a flowchart illustrating an exemplary process of determining matching information according to some embodiments of the present disclosure. In some embodiments, process 1200 may be used for determining the matching information in 610 of process 600.

In this case, the first transaction request may be obtained at the first time point, and the second transaction request may be obtained at the second time point. The first time point may be later than the second time point. The first transaction request may be an accepted request at the second time point, and the second transaction request may be a pending transaction request at the second time point.

In step 1210, matching probability sub-block 515 may obtain a first parameter according to the first origin, the first destination, the second origin and the second destination.

In some embodiments, the first parameter may include the distance between the second location of the service provider and the first origin, the distance between the second location of the service provider and the first destination, a second angle between a third original route and a fourth original route, a third ratio of the length of a third sharing route to the length of the third original route, and/or a fourth ratio of the length of a fourth sharing route to the length of the fourth original route. The third original route may be determined according to the first origin and the first destination. The fourth original route may be determined according to the second origin and the second destination. The third sharing route may be determined according to the first origin, the first destination and the second origin. The fourth sharing route may be determined according to the second origin, the second destination and the first destination.

In step 1220, matching probability sub-block 515 may obtain a provider weight corresponding to the first parameter. In some embodiments, the provider weight may be obtained according to historical data or empirical data.

In step 1230, matching probability sub-block 515 may determine a matching probability according to the first parameter and the provider weight.

Figure 13:
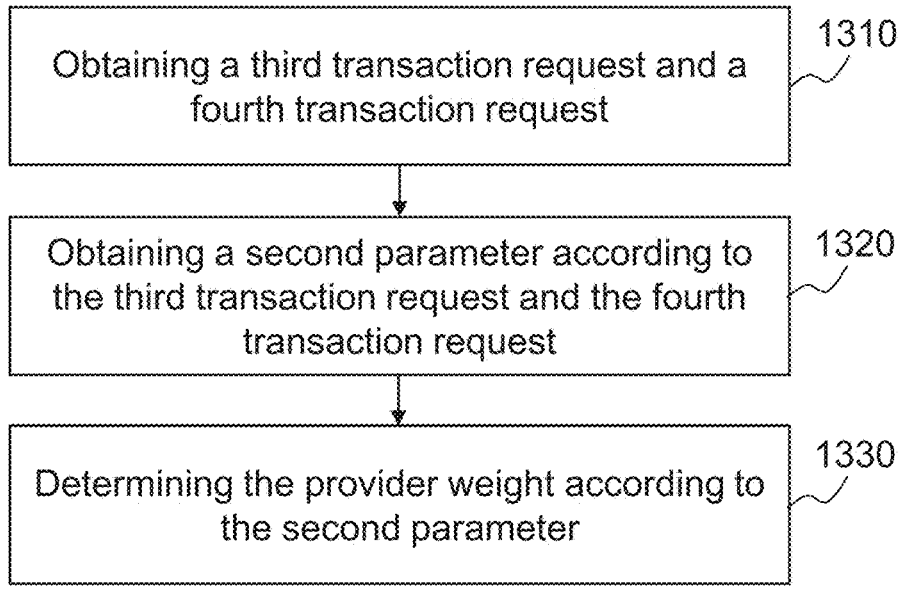
FIG. 13 is a flowchart illustrating an exemplary process of obtaining a provider weight according to some embodiments of the present disclosure.

FIG. 13 is a flowchart illustrating an exemplary process of obtaining a provider weight according to some embodiments of the present disclosure. In some embodiments, process 1300 may be used for obtaining the provider weight in 1220 of process 1200.

In step 1310, matching probability sub-block 515 may obtain a third transaction request and a fourth transaction request. In some embodiments, the third transaction request may be associated with a fourth transportation service, and the fourth transaction request may be associated with a fifth transportation service. The fourth transportation service may be successfully combined with the fifth transportation service.

In step 1320, matching probability sub-block 515 may obtain a second parameter according to the third transaction request and the fourth transaction request.

In step 1330, matching probability sub-block 515 may determine the provider weight according to the second parameter. In some embodiments, the provider weight may be determined by a weight model. The weight model may be obtained by training historical data in a period of time. The historical data may be one or more transaction requests associated with one or more transportation services that are successfully combined with some other transportation services. The period of time may include 1 hour, 1 day, 2 days, 1 week, 1 month, or the like. In some embodiments, the weight model may be obtained by using a linear regression model to train the historical data in a period of time. The linear regression model may include a logistic regression model, a support vector machine model (SVM), a least square model, or the like, or any combination thereof. The logistic regression model may be represented as Equation (1) and Equation (2), wherein, in this case, X is a variation variable, and refers to the second parameter, Y is a target variable, the equation Y=1 refers that the first transportation service associated with the first transaction request and the second transportation service associated with the second transaction request are combined into the third transportation service, the equation Y=0 refers that the first transportation service associated with the first transaction request and the second transportation service associated with the second transaction request are not combined into the third transportation service, P refers to a probability that the first transportation service associated with the first transaction request and the second transportation service associated with the second transaction request are not combined into the third transportation service, and W refers to a regression coefficient.

Figure 14:
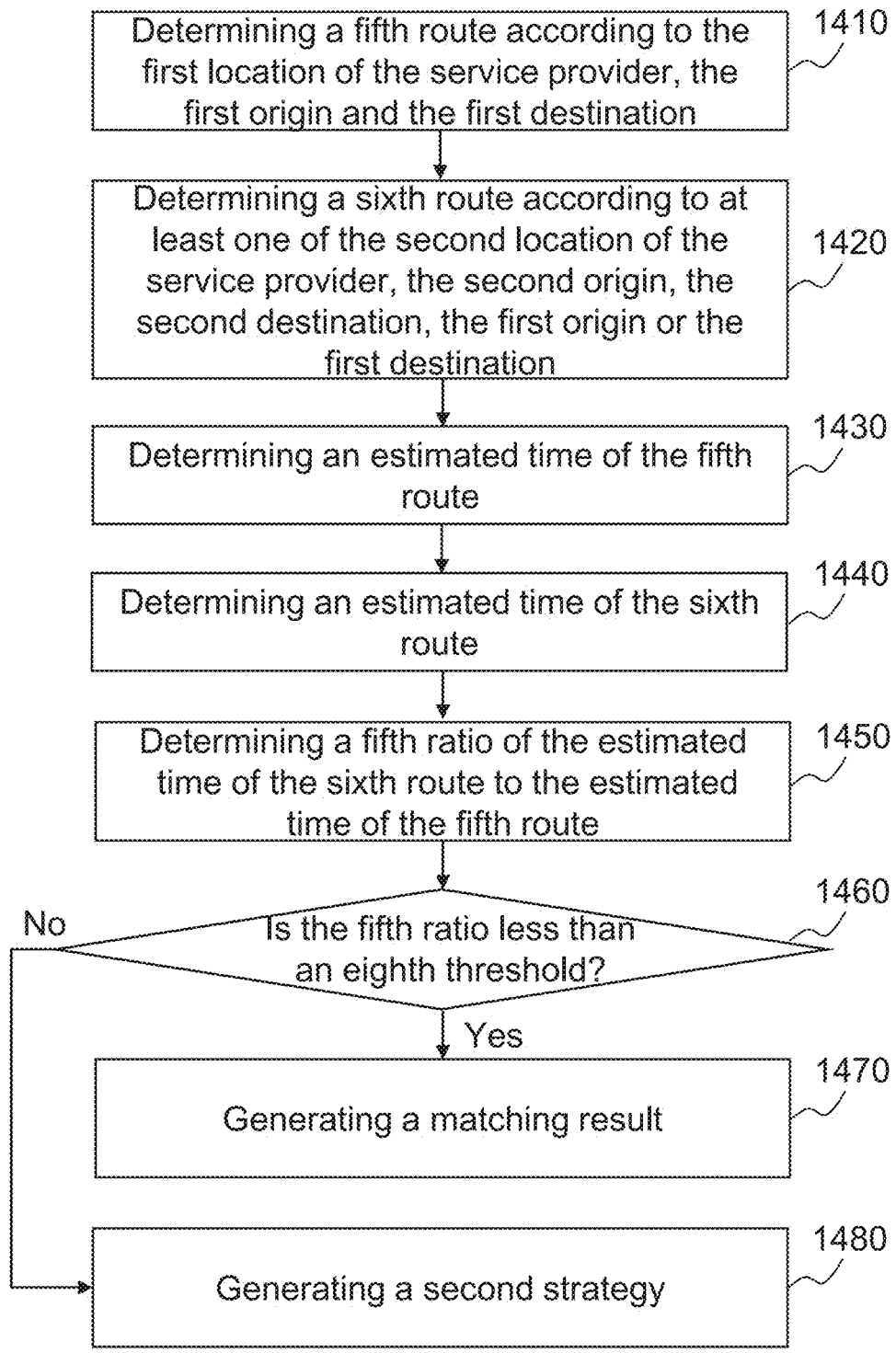
FIG. 14 is a flowchart illustrating an exemplary process of determining matching information according to some embodiments of the present disclosure.

FIG. 14 is a flowchart illustrating an exemplary process of determining matching information according to some embodiments of the present disclosure. In some embodiments, process 1400 may be used for determining the matching information in 610 of process 600.

In this case, the first transaction request may be obtained at the first time point, and the second transaction request may be obtained at the second time point. The first time point may be earlier than the second time point. The first transaction request may be an accepted request at the second time point, and the second transaction request may be a pending transaction request at the second time point.

In step 1410, estimated time sub-block 517 may determine a fifth route according to at least one of the first location of the service provider, the first origin, the second destination, the first origin and/or the first destination.

In step 1420, estimated time sub-block 517 may determine a sixth route according to the second location of the service provider, the second origin and the first destination. In some embodiments, when determining the fifth route and/or the sixth route, if there are more than one routes, estimated time sub-block 517 may select one route that satisfies a condition. The condition may include that the length of the route is the shortest, the traveling time of the route is the least, the traffic lights in the route are least, or the like, or any combination thereof.

In step 1430, estimated time sub-block 517 may determine an estimated time of the fifth route. In step 1440, estimated time sub-block 517 may determine an estimated time of the sixth route. In some embodiments, the estimated time may be determined by an estimated time model. The estimated time model may be obtained by training historical data in a period of time. The historical data may be one or more transaction requests associated with one or more transportation services that are successfully combined with some other transportation services. The period of time may include 1 hour, 1 day, 2 days, 1 week, 1 month, or the like. In some embodiments, the estimated time model may be obtained by using a linear regression model to train the historical data in a period of time. The linear regression model may include a logistic regression model, a support vector machine model (SVM), a least square model, or the like, or any combination thereof. The logistic regression model may be represented as Equation (1) and Equation (2), wherein, in this case, X is a variation variable, and refers to the estimated time of a route, Y is a target variable, the equation Y=1 refers that the first transportation service associated with the first transaction request and the second transportation service associated with the second transaction request are combined into the third transportation service, the equation Y=0 refers that the first transportation service associated with the first transaction request and the second transportation service associated with the second transaction request are not combined into the third transportation service, P refers to a probability that the first transportation service associated with the first transaction request and the second transportation service associated with the second transaction request are not combined into the third transportation service, and W refers to a regression coefficient.

In step 1450, estimated time sub-block 517 may determine a fifth ratio of the estimated time of the sixth route to the estimated time of the fifth route. Here, the fifth ratio may be used to measure the extent of detour of the first transaction request when the first transportation service is combined with the second transportation service.

In step 1460, matching result generation block 520 may determine whether the fifth ratio is less than an eighth threshold. If the answer is "yes", the process may proceed to step 1470 to generate a matching result by matching result generation block 520. If the answer is "no", the process may proceed to step 1480 to generate a second strategy by strategy generation block 540.

In some embodiments, step 1410 and step 1420 may be performed in any order. In some embodiments, step 1410 and step 1420 may be performed at the same time. In some embodiments, step 1430 and step 1440 may be performed in any order. In some embodiments, step 1430 and step 1440 may be performed at the same time. In some embodiments, step 1430 may be performed before or after step 1420.

Steps 1410-1450 may be performed by estimated time sub-block 517. Steps 1460-1470 may be performed by matching result generation block 520.

Figure 15:
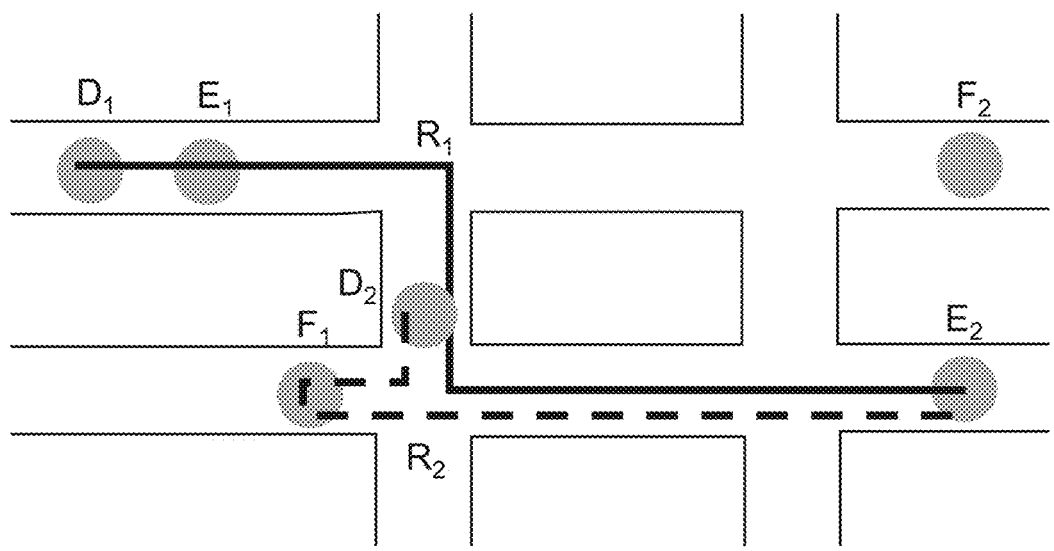
FIG. 15 is an exemplary diagram showing a fifth route and a sixth route according to some embodiments of the present disclosure.

FIG. 15 is an exemplary diagram showing a fifth route and a sixth route according to some embodiments of the present disclosure. As illustrated in FIG. 15, $D_1$ refers to the first location of the service provider, $D_2$ refers to the second location of the service provider, $E_1$ refers to the first origin, $E_2$ refers to the first destination, $F_1$ refers to the second origin, $F_2$ refers to the second destination, $R_1$ refers to the fifth route, and $R_2$ refers to the sixth route.

It should be noted that the fifth route and the sixth route illustrated in FIG. 15 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, in some embodiments, the fifth route may include a route from the second location of the service provider $D_2$ to the first destination $E_2$ in the first transportation service, and the sixth route may include a route from the second location of the service provider $D_2$ to the second origin $F_1$ in the third transportation service and a route from the second origin $F_1$ to the first destination $E_2$ in the third transportation service. As another example, in some embodiments, the fifth route may include a route from the first location of the service provider $D_1$ to the first destination $E_2$ in the first transportation service, and the sixth route may include a route from the first location of the service provider $D_1$ to the first destination $E_2$ in the third transportation service.

In some embodiments, the thresholds (e.g., the fourth threshold, the fifth threshold, or the like) mentioned in this disclosure may be obtained based on historical data, default settings of the on-demand service system 100, or an instruction from a user.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system for interacting with service receivers and service providers through an online transportation service platform, comprising:
  at least one first information exchange port of a service receiver system to communicate with a plurality of service receivers in the service receiver system via networks;
  at least one second information exchange port of a service provider system to communicate with a plurality of service providers each associated with a vehicle in the service provider system via the networks;
  a bus;
  one or more storage media electronically connected to the bus, including a set of instructions for operating an online sharable transportation platform; and
  logic circuits configured to communicate with the one or more storage media via the bus, wherein when executing the set of instructions, the logic circuits are directed to automatically:
    receive, via the at least one first information exchange port a first transaction request from a first mobile terminal of a first service receiver of the plurality of service receivers, the first transaction request associated with a first transportation service at a first time point, the first transaction request including a first origin and a first destination;
    receive, via the at least one first information exchange port a second transaction request from a second mobile terminal of a second service receiver of the plurality of service receivers, the second transaction request associated with a second transportation service at a second time point, the second transaction request including a second origin and a second destination;
    obtain service provider information of a third-party service provider of the plurality of service providers by tracking and receiving real-time locations of the third-party service provider from a positioning system in a third mobile terminal of the third-party service provider via the at least one second information exchange port;
    determine matching information online using one or more trained models based on the first transaction request, the second transaction request, and the service provider information, the matching information including at least one of a variation in a travel direction of the service provider which has accepted the first transaction request when the service provider goes to the second origin of the second transaction request, direction information, route information, a matching probability, or a ratio between an estimated travel time associated with the third transportation service and an estimated travel time associated with the first transportation service;
    to determine the matching information, the one or more trained models are configured to determine a probability to combine the first transportation service and the second transportation service into a third transportation service, the one or more trained models being a logistic regression model including a target variable and a variation variable, the variation variable corresponding to the matching information, the target variable representing whether to combine the first transportation service and the second transportation service into the third transportation service, the one or more trained models being trained by historical data including one or more transaction requests that are successfully combined with some other transaction requests;
    combine the first transportation service and the second transportation service into the third transportation service according to the matching information;
    interact with at least one of the service receiver system or the service provider system by online sending the first origin, the first destination, the second origin, the second destination, and the provider information to at least one of the first mobile terminal of the first service receiver in the service receiver system, the second mobile terminal of the second service receiver in the service receiver system or the third mobile terminal of the service provider in the service provider system in real time, directing the at least one of the first mobile terminal, the second mobile terminal, or the third mobile terminal to display the first origin, the first destination, the second origin, the second destination, and the provider information on a map.

2. The system of claim 1, wherein
the service provider information includes at least one of a first location of the service provider at the first time point or a second location of the service provider at the second time point.

3. The system of claim 1, wherein the logic circuits are further directed to:
  determine a first direction of the first transaction request according to the first origin and the first destination, a second direction of the second transaction request according to the second origin and the second destination, a first sharing route of the first transaction request, a second sharing route of the second transaction request, a first original route of the first transaction request and a second original route of the second transaction request, wherein the first sharing route is a route from the first origin to the first destination in the third transportation service, and the second sharing route is a route from the second origin to the second destination in the third transportation service;

determine a length of the first sharing route, a length of the second sharing route, a length of the first original route and a length of the second original route;

determine a first angle between the first direction and the second direction, a second ratio of the length of the first sharing route to the length of the first original route and a third ratio of the length of the second sharing route to the length of the second original route; and combine the first transportation service and the second transportation service into the third transportation service according to the first angle, the first ratio, and the second ratio.

4. The system of claim 2, wherein to determine the matching information using the one or more trained models the logic circuits are further directed to:

determine a first route according to the second location of the service provider at the second time point and the first destination of the first transaction request;

determine a second route according to the second origin of the second transaction request and the second destination of the second transaction request; and determine the variation in the travel direction of the service provider when the service provider goes to the second origin of the second transaction request according to the first route and the second route.

5. The system of claim 2, wherein to determine the matching information using the one or more trained models the logic circuits are further directed to:

determine a third route according to the second origin and the second destination and a fourth route according to the second location of the service provider at the second time point and the first destination;

obtain a first parameter according to the third route and the fourth route;

obtain a provider weight; and determine a matching probability according to the first parameter and the provider weight.

6. The system of claim 5, wherein the first parameter includes at least one of a distance between the second location of the service provider and the first origin, a distance between the second location of the service provider and the first destination, a second angle between the third route and the fourth route, a fourth ratio of a length of a third sharing route of the first transaction request to a length of a third original route, or a fifth ratio of a length of a fourth sharing route to a length of a fourth original route.

7. The system of claim 6, wherein to obtain the provider weight the logic circuits are further directed to:

obtain a third transaction request associated with a fourth transportation service and a fourth transaction request associated with a fifth transportation service, the third transportation service and the fourth transportation service being combined into a sixth transportation service that has been completed by the service provider;

obtain a second parameter according to the third transaction request and the fourth transaction request; and determine the provider weight according to the second parameter.

8. The system of claim 2, wherein to determine the matching information using the one or more trained models the logic circuits are further directed to:

determine a fourth route according to the first location of the service provider; the first origin and the first destination;

determine a first estimated time of the fourth route;

determine a fifth route according to at least one of the second location of the service provider, the second origin, the second destination, the first origin or the first destination;

determine a second estimated time of the fifth route; and determine the first ratio of the second estimated time to the first estimated time.

9. A method for interacting with a plurality of service receivers and a plurality of service providers through an online transportation service platform, comprising automatically:

receiving, in real time by a computer server of an online on-demand transportation service platform from a first mobile terminal of a first service receiver of the plurality of service receivers via at least one information exchange port of a service receiver system, a first transaction request associated with a first transportation service at a first time point, the first transaction request including a first origin and a first destination;

receiving, in real time by the computer server from a second mobile terminal of a second service receiver of the plurality of service receivers via the at least one information exchange port of the service receiver system, a second transaction request associated with a second transportation service at a second time point, the second transaction request including a second origin and a second destination;

obtaining, by the computer server via at least one second information exchange port of a service provider system in real time, service provider information of a third-party service provider of the plurality of service providers by tracking and receiving real-time locations of the third-party service provider from a positioning system in a third mobile terminal of the third-party service provider;

determine matching information online using one or more trained models based on the first transaction request, the second transaction request, and the service provider information, the matching information including at least one of a variation in a travel direction of the service provider which has accepted the first transaction request when the service provider goes to the second origin of the second transaction request, direction information, route information, a matching probability, or a ratio between an estimated travel time associated with the third transportation service and an estimated travel time associated with the first transportation service;

to determine the matching information, the one or more trained models are configured to determine a probability to combine the first transportation service and the second transportation service into a third transportation service, the one or more trained models being a logistic regression model including a target variable and a variation variable, the variation variable corresponding to the matching information, the target variable representing whether to combine the first transportation service and the second transportation service into the third transportation service, the one or more trained models being trained by historical data including one or more transaction requests that are successfully combined with some other transaction requests;

combining, by the computer server, the first transportation service and the second transportation service into the third transportation service according to the matching information;

and sending, by the computer server, the first origin, the first destination, the second origin, the second destination, and the provider information to at least one of the first mobile terminal of the first service receiver, the second mobile terminal of the second service receiver or the third mobile terminal of the service provider, directing the at least one of the first mobile terminal, the second mobile terminal, or the third mobile terminal to display the first origin, the first destination, the second origin, the second destination, and the provider information on a map.

10. The method of claim 9, wherein
the service provider information includes at least one of a first location of the service provider at the first time point or a second location of the service provider at the second time point.

11. The method of claim 9, further comprising:
determining a first direction of the first transaction request according to the first origin and the first destination, a second direction of the second transaction request according to the second origin and the second destination, a first sharing route of the first transaction request, a second sharing route of the second transaction request, a first original route of the first transaction request and a second original route of the second transaction request, wherein the first sharing route is a route from the first origin to the first destination in the third transportation service, and the second sharing route is a route from the second origin to the second destination in the third transportation service;
determining a length of the first sharing route, a length of the second sharing route, a length of the first original route and a length of the second original route;
determining a first angle between the first direction and the second direction, a second ratio of the length of the first sharing route to the length of the first original route and a third ratio of the length of the second sharing route to the length of the second original route; and
combining the first transportation service and the second transportation service into the third transportation service according to the first angle, the first ratio, and the second ratio.

12. The method of claim 10, wherein the determining of the matching information using the one or more trained models includes:
determining a first route according to the second location of the service provider at the second time point and the first destination of the first transaction request;
determining a second route according to the second origin of the second transaction request and the second destination of the second transaction request; and
determining the variation in the travel direction of the service provider when the service provider goes to the second origin of the second transaction request according to the first route and the second route.

13. The method of claim 10, wherein the determining of the matching information using the one or more trained models includes:
determining a third route according to the second origin and the second destination and a fourth route according to the second location of the service provider at the second time point and the first destination;
obtaining a first parameter according to the third route and the fourth route;
obtaining a provider weight; and
determining a matching probability according to the first parameter and the provider weight.

14. The method of claim 13, wherein the first parameter includes at least one of a distance between the second location of the service provider and the first origin, a distance between the second location of the service provider and the first destination, a second angle between the third route and the fourth route, a fourth ratio of a length of a third sharing route of the first transaction request to a length of a third original route, or a fifth ratio of a length of a fourth sharing route to a length of a fourth original route.

15. The method of claim 14, wherein the obtaining of the provider weight includes:
obtaining a third transaction request associated with a fourth transportation service and a fourth transaction request associated with a fifth transportation service, the third transportation service and the fourth transportation service being combined into a sixth transportation service that has been completed by the service provider;
obtaining a second parameter according to the third transaction request and the fourth transaction request; and
determining the provider weight according to the second parameter.

16. The method of claim 10, wherein the determining of the matching information using the one or more trained models includes:
determining a fourth route according to the first location of the service provider, the first origin and the first destination;
determining a first estimated time of the fourth route;
determining a fifth route according to at least one of the second location of the service provider, the second origin, the second destination, the first origin or the first destination;
determining a second estimated time of the fifth route; and
determining the first ratio of the second estimated time to the first estimated time.

17. A non-transitory computer readable medium, comprising at least one set of instructions for interacting with a plurality of service receivers and a plurality of service providers through an online transportation service platform—
wherein when executed by one or more processors of a computing device, the at least one set of instructions causes the computing device to perform a method, the method comprising automatically:
receiving, in real time by a computer server of an online on-demand transportation service platform from a first mobile terminal of a first service receiver of the of service receivers via at least one information exchange port of a service receiver system, a first transaction request associated with a first transportation service at a first time point, the first transaction request including a first origin and a first destination;
receiving, in real time by the computer server from a second mobile terminal of a second service receiver of the plurality of service receivers via the at least one information exchange port of the service receiver system, a second transaction request associated with a second transportation service at a second time point, the second transaction request including a second origin and a second destination;
obtaining, by the computer server via at least one second information exchange port of a service provider system in real time, service provider information of a third-party service provider of the plurality of service providers by tracking and receiving real-time locations of the third-party service provider from a positioning system in a third mobile terminal of the third-party service provider;
determine matching information online using one or more trained models based on the first transaction request, the second transaction request, and the service provider information, the matching information including at least one of a variation in a travel direction of the service provider which has accepted the first transaction request when the service provider goes to the second origin of the second transaction request, direction information, route information, a matching probability, or a ratio between an estimated travel time associated with the third transportation service and an estimated travel time associated with the first transportation service;
to determine the matching information, the one or more trained models are configured to determine a probability to combine the first transportation service and the second transportation service into a third transportation service, the one or more trained models being a logistic regression model including a target variable and a variation variable, the variation variable corresponding to the matching information, the target variable representing whether to combine the first transportation service and the second transportation service into the third transportation service, the one or more trained models being trained by historical data including one or more transaction requests that are successfully combined with some other transaction requests;
combining, by the computer server, the first transportation service and the second transportation service into the third transportation service according to the matching information; and
sending, by the computer server, the first origin, the first destination, the second origin, the second destination, and the provider information to at least one of the first mobile terminal of the first service receiver, the second mobile terminal of the second service receiver or the third mobile terminal of the service provider, directing the at least one of the first mobile terminal, the second mobile terminal, or the third mobile terminal to display the first origin, the first destination, the second origin, the second destination, and the provider information on a map.

18. The non-transitory computer readable medium of claim 17, wherein the determining of the matching information using the one or more trained models includes:
determining a first route according to the second location of the service provider at the second time point and the first destination of the first transaction request;
determining a second route according to the second origin of the second transaction request and the second destination of the second transaction request; and
determining the variation in the travel direction of the service provider when the service provider goes to the second origin of the second transaction request according to the first route and the second route.

19. The non-transitory computer readable medium of claim 17, wherein the determining of the matching information using the one or more trained models includes:
determining a third route according to the second origin and the second destination and a fourth route according to the second location of the service provider at the second time point and the first destination;
obtaining a first parameter according to the third route and the fourth route;
obtaining a provider weight; and
determining a matching probability according to the first parameter and the provider weight.

20. The non-transitory computer readable medium of claim 17, wherein the determining of the matching information using the one or more trained models includes:
determining a fourth route according to the first location of the service provider, the first origin and the first destination;
determining a first estimated time of the fourth route;
determining a fifth route according to at least one of the second location of the service provider, the second origin, the second destination, the first origin or the first destination;
determining a second estimated time of the fifth route; and
determining the first ratio of the second estimated time to the first estimated time.

* * * * *